April 30, 1935.  A. LICHT  1,999,635
LAWN MOWER SHARPENER
Filed Feb. 24, 1934
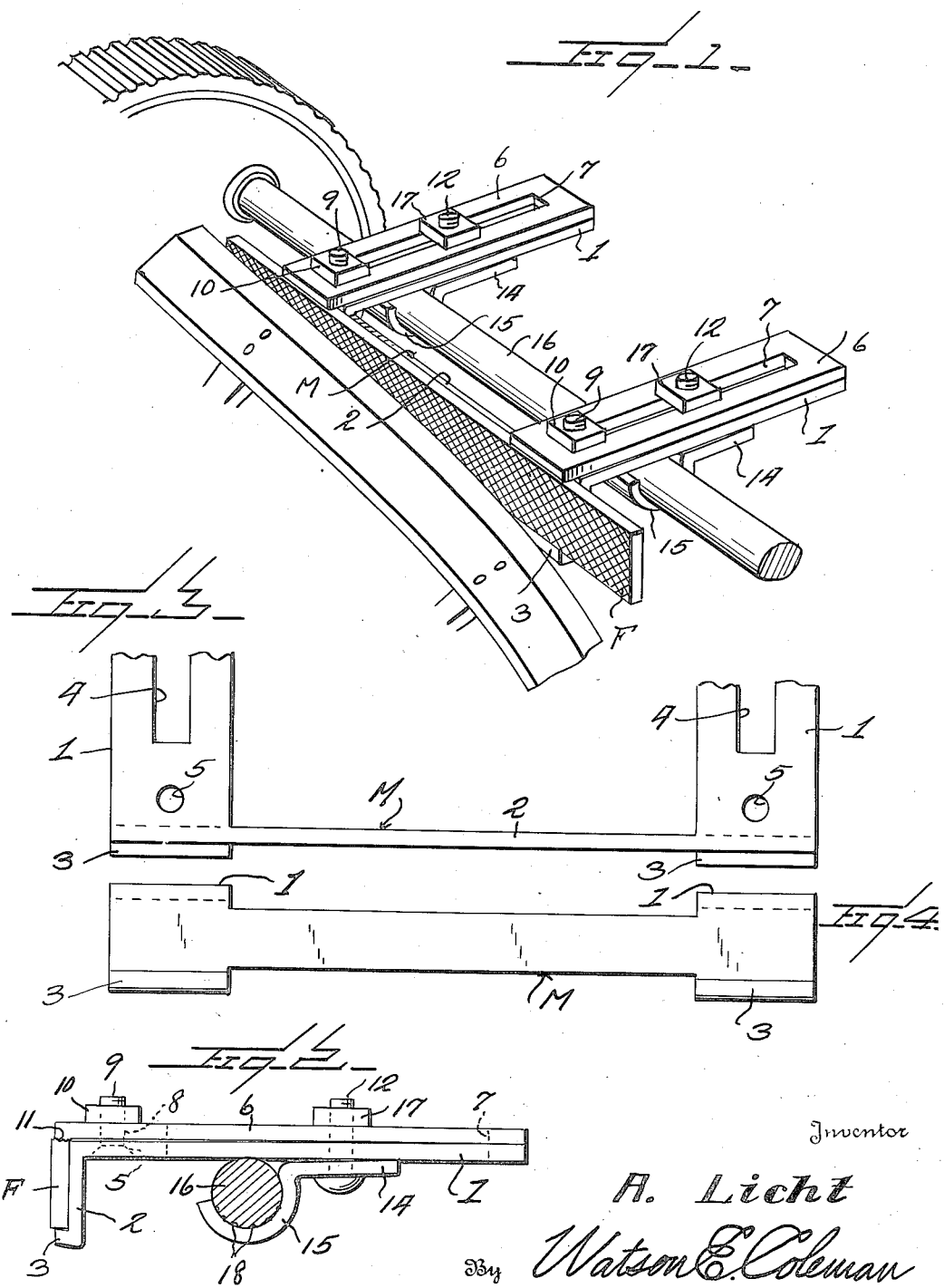
Inventor
A. Licht
By Watson E. Coleman
Attorney Patented Apr. 30, 1935

1,999,635

UNITED STATES PATENT OFFICE 1,999,635

LAWN MOWER SHARPENER

Arthur Licht, Fulton, S. Dak.

Application February 24, 1934, Serial No. 712,838

2 Claims. (Cl. 76—82.1)

This invention relates to a lawn mower sharpener, and it is an object of the invention to provide a device of this kind which is intended to be mounted upon the tie rod of a lawn mower and which includes mountings for a file for coaction with the blades of the mower.

Another object of the invention is to provide a device of this kind comprising mountings of a character whereby the file is held in what may be termed a solid frame, together with means whereby the desired adjustments may be easily and readily made to assure the proper placement of the file with respect to the blades of the mower.

The invention consists in the details of construction and in the combination and arrangement of the several parts of my improved lawn mower sharpener whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in perspective of a lawn mower showing applied thereto a sharpener device constructed in accordance with an embodiment of my invention;

Figure 2 is a view in end elevation of the device as illustrated in Figure 1 with the associated connecting or tie bar or rod in section;

Figure 3 is a fragmentary view in top plan of the main or body member of the device;

Figure 4 is a view in front elevation of the main or body member as illustrated in Figure 1.

As disclosed in the accompanying drawing, my improved sharpener device comprises a main or body member M consisting of two elongated members 1 arranged in parallelism and spaced apart a desired distance. These members 1 are flat and have their forward ends formed with the upper marginal portion of the extremities of an elongated flat member 2 of a length dependent upon the distance it is desired to space the members 1. Each end portion of the member 2 directly below the adjacent end of a member 1 has its lower marginal portion provided with a forwardly directed lip or flange 3 constituting a shoulder or jaw upon which is adapted to directly engage the longitudinal edge of an elongated file F or kindred cutting member. Each of the members 1 in a major portion of its length is provided with an elongated slot 4 and between the member 2 and the adjacent end of the slot 4 said member 1 has an opening 5 herein disclosed as in alignment with the slot 4.

An elongated clamping member 6 is adapted to rest from above upon each of the members 1 and this member 6 is also provided throughout a major portion of its length with an elongated slot 7 adapted to register with the slot 4 of the associated member 1. The plate or member 6 in advance of the slot 7 is provided with an opening 8 registering with the opening 5 in the associated member 1 so that a headed member 9 may be inserted from below through said registering slots or openings 5 and 8. The shank of the member 9 is adapted to have threaded thereon a clamping nut 10 whereby the forward end portions of the associated members 1 and 6 may be effectively held in applied position and also to hold the forward end portion of the member 6 in desired clamping engagement with the applied file F. To assure this engagement of the member 6 with the file F it is to be noted in the accompanying drawing that the member 6 is of a length to have its forward end portion extend beyond the outer face of the member 2 to provide a jaw opposed to the flange or lip 3 hereinbefore referred to. This extended portion of the member 6 preferably has its under surface roughened or serrated, as indicated at 11 in Figure 2, to assure an effective gripping action upon the file F and particularly to eliminate the liability of the file F slipping or turning out of position.

Disposed through the registering slots 4 and 7 of each pair of associated members 1 and 6 from below is a headed shank 12 which is also freely directed through an outstanding flat arm 14 extending from an end portion of a substantially U-shaped jaw 15 for contact from below with the connecting or tie bar or rod 16 of the lawn mower structure. The upper portion of this headed member 12 has threaded thereon a holding nut 17 whereby the member 1 is effectively held upon the bar or rod 16 and at the same time holding the jaw 15 in a selected position with respect to the member 1 as determined by the required placement of the file F with respect to the blades of the mower to be sharpened by the device.

As illustrated in Figure 2, the working face of each of the jaws 15 is toothed or roughened, as indicated at 18, to assure the most effective engagement of the jaw 15 with the bar or rod 16.

It is believed to be apparent from the foregoing that in the complete assembly of the device the file or cutting member F is held in what might be termed a solid frame and this is of advantage as it facilitates the application of the device in working position. It is believed to be obvious that in applying the device in working position it is only required to tighten the nut 17 to bring the jaws 15 into desired clamping engagement with the bar or rod 16.

From the foregoing description it is thought to be obvious that a lawn mower sharpener constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A lawn mower sharpener comprising an elongated and substantially flat member, a pair of substantially parallel members carried by the first named member at points spaced lengthwise of the first named member and substantially at right angles thereto, said second members being arranged at a longitudinal marginal portion of the first member, fixed jaws carried by the first member and disposed in a direction opposite to the second named members, said fixed jaws being at the opposite longitudinal marginal portion of the first member, clamping jaws carried by the second members for coaction with the first named jaws to hold a sharpening element in overlying position with respect to the elongated member, and means carried by the second members and coacting therewith for securing said second members to a support, said last named means being selectively adjustable lengthwise of the second members.

2. A device of the class described comprising an elongated flat member, a pair of members engaged with a marginal portion of the first member and extending rearwardly therefrom, said members having slots substantially in parallel, additional members overlying the second named members, means for securing said last named members to the second named members with an end portion of the last named members disposed beyond the outer face of the first member to permit said last named members to act as jaws, said last named members having slots registering with the slots of the second named members, jaws carried by the first member and extending beyond the outer face thereof, said last named jaws being substantially in alignment transversely of the first member with the jaws afforded by the projected end portions of the last named members, clamping members coacting with the inner faces of the second named members, and means coacting with the clamping members and with the last named members and disposed through the slots of the second named members and the last named members for selectively holding the clamping members with respect to the first member, the jaws operating to engage and hold a sharpening element.

ARTHUR LICHT.